(12) United States Patent
Almgren et al.

(10) Patent No.: US 7,933,218 B2
(45) Date of Patent: Apr. 26, 2011

(54) POWER CONTROL AND CHANNEL SELECTION IN A MULTI CHANNEL COMMUNICATION SYSTEM

(75) Inventors: Magnus Almgren, Sollentuna (SE); Per Skillermark, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 691 days.

(21) Appl. No.: 11/793,913

(22) PCT Filed: Dec. 22, 2004

(86) PCT No.: PCT/SE2004/002009
§ 371 (c)(1),
(2), (4) Date: Apr. 4, 2008

(87) PCT Pub. No.: WO2006/068565
PCT Pub. Date: Jun. 29, 2006

(65) Prior Publication Data
US 2009/0080376 A1   Mar. 26, 2009

(51) Int. Cl.
*H04B 7/005* (2006.01)
(52) U.S. Cl. .................................. 370/252; 455/522
(58) Field of Classification Search ............... 370/252; 455/522
See application file for complete search history.

(56) References Cited

U.S. PATENT DOCUMENTS
2003/0193907 A1   10/2003   Rezaiifar et al.

FOREIGN PATENT DOCUMENTS
WO          03019953         3/2003
WO    WO 2006068565 A1 *   6/2006

OTHER PUBLICATIONS

International Search Report mailed Sep. 1, 2005.
Pietrzyk et al.: "Radio Resource Allocation for Cellular Networks Based on OFDMA with Qos Guarantees," IEEE Communications Society, Global Telecommunications Conference 2004, vol. 4, pp. 2694-2699, XP010758015.

* cited by examiner

*Primary Examiner* — Melvin Marcelo
(74) *Attorney, Agent, or Firm* — Nixon & Vanderhye P.C.

(57) ABSTRACT

A method for allocating power and channels to connections in a multi-channel access based wireless communication system in which each connection is acting independently of the other. The quality of each channel of a connection is measured at successive time steps (n, n+1). The measurements from a previous time step (n) are used to allocate, in the following time step (n+1), an average power of all channels the connection uses as well as individual power settings in-between said channels. The average power is controlled using an outer fairness loop balancing the average channel power against average bit rate per channel. The individual power settings is controlled using an inner capacity loop allocating much power to good channels and restricted power to poor channels. Each loop has a respective target relation and the results of the loops are combined in order to determine transmission power in the next time step. The method is of distributed character and may execute on individual receiving nodes. Further, it may be applied in the up link or in the down link.

15 Claims, 5 Drawing Sheets

POWER CONTROL AND CHANNEL SELECTION IN A MULTI CHANNEL COMMUNICATION SYSTEM

This application is the U.S. national phase of International Application No. PCT/SE2004/002009 filed 22 Dec. 2004, the entire contents of which are hereby incorporated herein by reference.

BACKGROUND

In the following the expressions of channel, connection and carrier will be used in a general sense.

No global definition of a channel will be given, since the channel concept varies depending on the radio access network (RAN) used. For example, in a FDMA system a channel is a frequency and channels are separated by frequency. In a TDMA system a channel is a time slot and channels are separated by time. In a CDMA system a channel is a code and channels are separated by codes. A RAN system can have a channel concept comprising different combinations of frequency, time slot and code. In fact a channel concept may be provided for each possible combination of frequency, time slot and code. Finally it should be noted that a channel has an extension in space. The expression of carrier is used in a general sense and is defined as the means by which information is transported. In a FDMA system a carrier is a frequency or narrow frequency band, in a TDMA system it is a time slot, and in a CDMA system an allocated code. A connection may comprise a single carrier or multiple carriers. A multiple carrier connection comprises multiple channels each channel using a single carrier.

Channel quality is affected by many parameters, among these channel insulation which, expressed in a very general and non-exhaustive way, may be said to be a measure of signal leakage between channels. Such leakage causes interference on other channels if they are close to each other in space. Remember that a channel has a limited extension in space. The more they are separated, the less is the signal leakage. Channel quality is also affected by signal leakage between connections. If one connection is transmitting with high power it will cause interference with an adjacent connection on the same channel(s). Interference caused by signal leakage between connections is usually less than interference caused by signal leakage between a connection's channels.

Technically it is easier to combat leakage in the time domain than in the frequency domain. Leakage in the frequency domain is usually larger than leakage in the time domain and therefore a TDMA system has the better channel insulation than an FDMA system.

Power control and frequency control are means by which interference is defeated.

In wireless networks, a trade-off between system capacity and connection capacity can often be observed.

A very general and non-exhaustive definition of channel capacity is the amount of information transferred over a channel during a certain time period.

A very general and non-exhaustive definition of connection capacity is the sum of the channel capacities of all channels included in a connection.

A very general and non-exhaustive definition of system capacity is the sum of the connection capacities of all connections existing in the system. The more information the system can transmit the better the system capacity.

The distribution of the connection capacities in a system relates the system capacity to the number of set up connections and their respective capacity. In a system, one typically strives for a narrow distribution of the connection capacities and a high system capacity. One may often observe that there is a conflict between these two objectives. If all transmitters should be given a possibility to transmit, connections with poor channel qualities will take a proportionally large amount of the available system resources in order to transmit only a small amount of information. The trade-off lies therein that to achieve a high system capacity, one should serve connections with good channel qualities. On the other hand, to obtain a high degree of fairness, one may have to promote connections with poor channel qualities and to treat connections with good channel qualities unfairly. The distribution of connection capacities may be thought of as fairness. A bad connection requiring a high transmission power should have an opportunity to transmit and/or a good connection must give away some transmission power for the benefit of the bad connections.

The capacity of a radio access network can sometimes be limited by the interference of other connections and by multipath, inter-symbol interference (ISI) of the transmitted signal. Raising the transmit power on an individual connection may not be helpful if it ultimately leads to a "party effect" where all connections are "talking" (transmitting) loudly in an attempt to be heard. In other words, when a poor or deteriorating channel quality is detected, the deteriorated connection increases its transmit power in an attempt to improve the quality. By increasing the transmission power on the deteriorated connection interference is caused on other connections which will reduce their channel qualities. So naturally, the other connections increase their own transmit powers hoping to restore their channel quality. This process continues until the transmit power level reaches a maximum value and no further transmit power increases are permitted.

The "party effect" may be exemplified by the following example. User A is communicating with user B on a channel that has a particular, acceptable, Carrier over Interference quality value C/I. Simultaneously with this communication another user C is having a communication with user D on the same channel, that is on the same time slot/frequency/code resource, with an acceptable, C/I quality value or on a different channel with acceptable C/I in which case there is signal leakage between the channels. Now suppose the channel quality of user A deteriorates with 1 dB. To compensate for this A increases the transmission power with 1 dB. The power increase will cause interference on C's channel. The signal/noise ratio of C's channel is influenced by the power increase. So C's channel quality will deteriorate with 1 dB. To compensate for this C increases the transmission power with 1 dB. The increased transmission power causes interference on A' channel and A's channel quality will decrease with 1 dB. So A increases the transmission power etc. etc. The process continues until the maximum transmission power allowed by the system is reached.

A previously known method to prevent the "party effect" is to refrain from compensating a deteriorated channel quality in full, and instead use a compensation scheme according to which a deteriorating channel quality is compensated only partly. For example, suppose the channel quality of user A deteriorates with 1 dB. To compensate for this A now increases the transmission power with only half the deterioration, that is ½ dB. This increased power will cause interference with C's channel. It will increase the noise on C's channel. So C's channel quality will deteriorate with ½ dB. To compensate for this C increases the transmission power with half the deterioration, that is with ¼ dB. The increased transmission power causes interference on A's channel and A's channel quality will decrease with ¼ dB. So A increases the transmission power with ⅛ dB etc. etc. The process continues, but this time the sum of the successive power settings at A as well as at C will converge and reach a limit power below the maximum transmission power allowed by the system. In the first example above the compensation factor is 1 and in the second example it is ½. Of course other compensation schemes with other factors, or varying factors, between 0 and 1 may be used.

SUMMARY

In a wide sense one object is to provide a method that promotes both high connection capacity and system capacity in the network.

A trade off between system capacity and connection capacity is achieved by applying a method comprising an outer and an inner loop, the outer loop, referred to as fairness loop, balancing the system's connection capacities by distributing transmission power among connections and the inner loop, referred to as capacity loop, acting on individual connections and maximizing the connection capacity by distributing the available transmission power among the many channels which make up a connection.

Control of the balance in accordance with outer fairness loop implies that the following fairness aspect is captured: a connection that consumes a lot of resources (power), and hence causes a lot of interference in the system, must confine with a low data rate. Since the power per bit assigned to connections in poor positions generally exceeds the power per bit allocated to connections in good positions, the poor connections are, at least to some extent, compensated for their unfortunate situation.

Control of power in accordance with the inner capacity loop implies that varying weight is given the different channels in order to obtain a reasonable balance between channel power and the bit rate on each individual channel. In this case, the philosophy is that the power should be used where it can do the most good. Good channels with a high channel quality are assigned more power than poor channels with low channel quality.

The method may be applied either in the uplink or in the downlink of a mobile radio network.

A method of the indicated type which is unambiguous and distributed is also provided.

Unambiguous means the method will end up in the same solution independent of the initial conditions. That is, given the radio connectivity conditions, the method converges to the same power allocation independent of the initial power setting.

The distribution feature may or may not be applied. The fact that the method is distributed implies that it can be implemented locally in nodes of the radio access system, e.g. in terminals or in access points. Once having access to certain system parameters each node must only keep track of which transmit power that is used on the different channels and the resulting bit rate on each channel. If the distribution feature is not applied the method may execute in a central node of the radio access system (for example NodeB in UTRAN).

The quality of each channel of a connection is measured at successive time steps (n, n+1). The measurements from a previous time step (n), or a mean value or weighted mean value of measurements taken at several previous time steps, are used to allocate, in the following time step (n+1), an average power of all channels of a connection (outer fairness loop), as well as individual power settings in-between said channels (power control in inner capacity loop). If a weighted mean value of measurements taken at several previous time steps is used, the latest measurements are typically given more weight than the previous ones. The average power is controlled using the outer fairness loop. The individual power settings is controlled using the inner capacity loop allocating much power to good channels and restricted power to poor channels. Each loop has a respective target relation and the results of the loops are combined in order to determine transmission power in the next time step (n+1).

DETAILED DESCRIPTION

Figure 1:
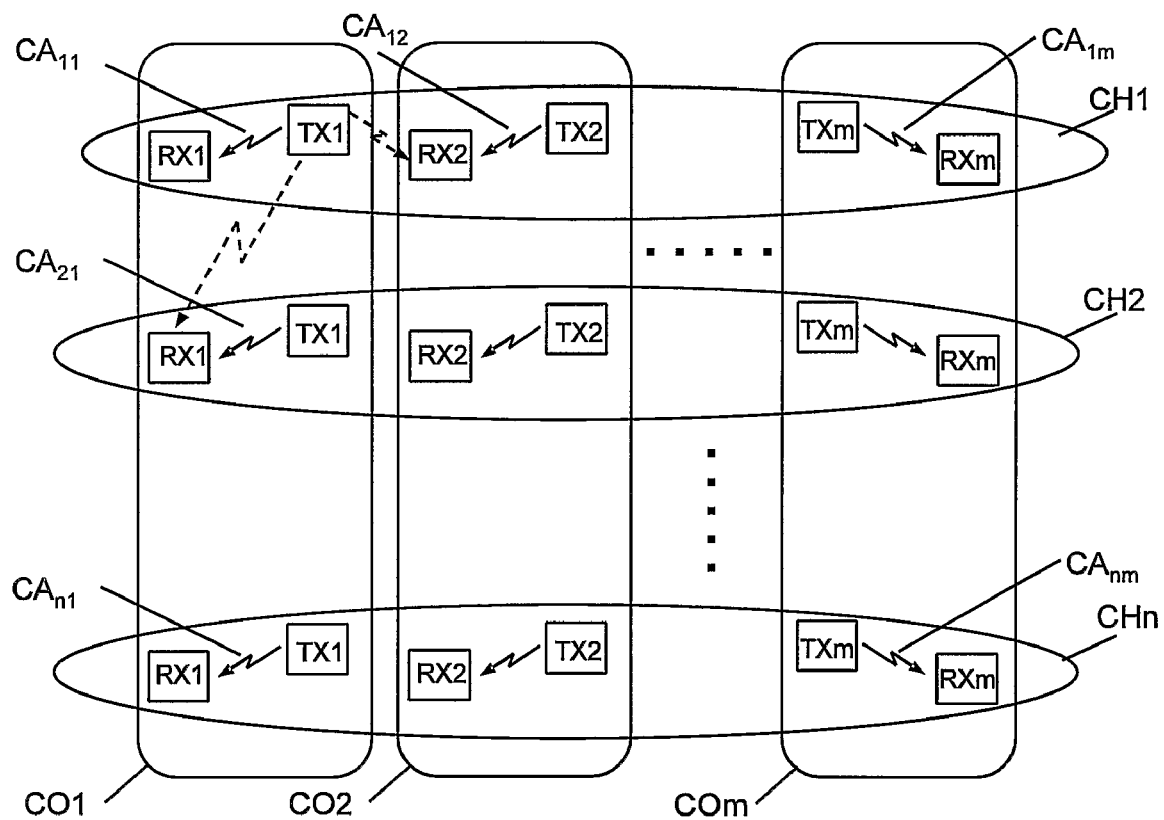
FIG. 1 is a diagram illustrating the channel and connection definitions when applied in a multi-transmitter multi-receiver radio system, FIG. 2 a diagram similar to FIG. 1 when applied to a cellular mobile radio system.

FIG. 1 illustrates the channel and connection definitions. A radio system using the above transmission scheme is shown schematically in FIG. 1 and comprises a plurality of transmitters TX1, TX2, ... TXm. Transmitter TX1 is transmitting simultaneously on a number of channels CH1, CH2, ... CHn. The definition of a channel has been given above. Although many transmitters TX1 are shown, there is typically just one transmitter unit that is transmitting on the many channels CH1, CH2, ... CHn. The same also apply for the many transmitters TX2, ... TXm. There are also a plurality of receivers RX1, RX2, ... RXm which are receiving on the many channels CH1, CH2, ... CHn. Although many transmitters RX1 are shown, there is typically just one receiver unit that is receiving on the many channels. The same is true for the other receivers RX2, ... RXm.

Transmitter TX1 is transmitting simultaneously to receiver RX1 on said plurality of channels CH1, CH2, ... CHn. The respective transmissions take place on individual carriers $CA_{11} \ldots CA_{n1}$. The TX1 transmissions on carriers $CA_{11} \ldots CA_{n1}$ are said to define a connection CO1. Similar transmissions take place between transmitters TX2 and receivers RX2 on $CA_{12} \ldots CA_{n2}$ and form a connection CO2. There are m connections. On connection COm transmitters TXm are transmitting to receivers RXm on carriers $CA_{1m} \ldots CA_{nm}$.

A transmitter, such as TX1, may transmit to many receivers on the respective channels and not just to RX1 as shown. In other words, there may exist many receivers that listen to the transmission of TX1.

When TX1 is transmitting on channel CH1 it interferes with RX1 on channel CH2 and with RX2 on CH1 as indicated by the dashed arrows. It may also interfere with receivers on other channels depending on individual geographical distances and power settings.

Figure 2:
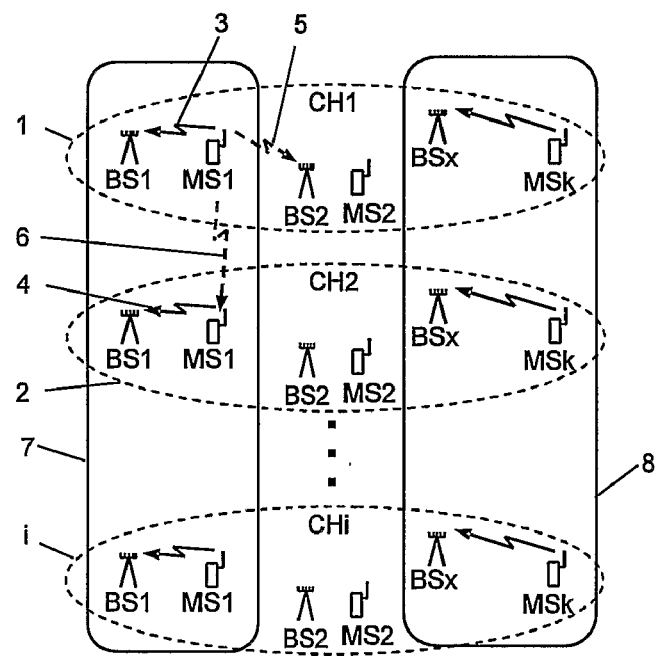

In FIG. 2 an implementation of the transmission scheme in a mobile radio system is shown. The mobile radio system comprises a plurality of base stations BS1, BS2, ... BSm and mobile units MS1, MS2 ... MSN. Mobile MS1 is transmitting simultaneously to BS1 on a plurality channels CH1, CH2, ... CHO shown by ellipses 1, 2, ... i. In reality a mobile may be transmitting simultaneously on several hundreds of channels. Base station BS1 is thus receiving the signal from MS1 on many channels. Note that the BS1 in ellipses 1, 2 ... i physically is one and the same base station. Likewise for MS1, BS2, MS2, BSm and MSO.

Ellipse 1 is illustrating the geographical extension of CH1, that is the area within which the signal from MS1 is possible to capture. In a similar manner ellipse 2 illustrates the geographical extension of CH2 and ellipse i that of channel CHi.

The transmission of MS1 to BS1 on CH1 is shown by arrow 3 and on CH2 with the arrow 4. Transmission 3 in CH1 causes interference, as shown by arrow 5, on channel CH1 at base station BS2. The same transmission 3 in CH1 also causes interference, as shown by arrow 6, on channel CH2 at MS1.

Similar interferences appear on CH1 and CH2 when MS2 transmits to BS2 on CH1. It should be noted that MS2 may transmit on CH1 simultaneously with MS1.

The better the insulation between CH1 and CH2 is, the less is the interference 6.

Mobile station MS1 has a connection 7 and mobile station MSk has another connection 8 as shown by the corresponding ellipses 7 and 8 in FIG. 2.

A connection controls itself in respect of transmission power and obtained bit rate on the various channels CH1, CH2, . . . CHi, without the need to co-ordinate its power settings with the power settings of another connection.

Figure 3:
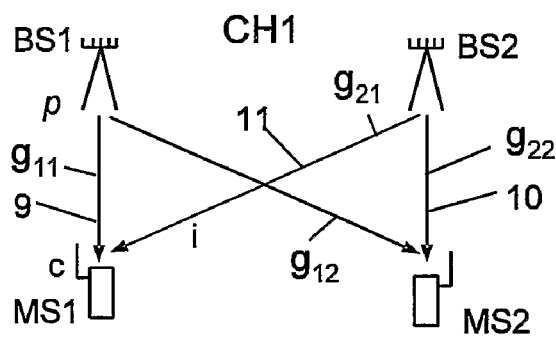
FIG. 3 is a diagram illustrating two connections and corresponding useful and interfering signals.

Having described and illustrated the basic definitions reference is made to FIG. 3 which is a schematic signal diagram illustrating the case in which BS1 is transmitting to MS1, arrow 9, simultaneously as BS2 is transmitting to MS2, arrow 10. The transmissions are on channel CH1. The BS2 transmission causes interference i, arrow 11, with the signal 9 as received at MS1. If p is the power with BS1 is transmitting,
g is the gain g11 between BS1 and MS1 on CH1, i is the interference 11,
c is the power with which the transmission from BS1 is received at MS1,
γ is a quality value, and
i, p, g, c, γ all are expressed in log values, then the received power is $$c = p + g. \qquad \text{Eq. 1}$$

For example, if BS1 is transmitting with 1 W ($10^3$ mW) (which is equal to 30 $dB_m$) a possible value of the power c of the received signal is $10^{-12}$ W (equal to −90 $dB_m$) indicating a power decrease in the order more than millions of millions. If the channel gain g is −120 dB inserting the dB values into Eq. 1 gives $$-90 = 30 + (-120)$$

Above i and g together constitutes a channel. A large value of g implies a good channel.

The quality value of channel CH1 is the received power minus the interference:

$$\gamma = c - i \qquad \text{Eq. 2}$$

Inserting Eq. 2 in Eq. 1 gives $$\gamma = p + g - i \qquad \text{Eq. 3}$$

It is possible to control p, but g and i cannot be controlled if the system is distributed. Interference i has its origin in power from other connections and sources not related to transmissions within the system (noise).

In a system wherein p is measured and set at regular time steps 1, 2, 3 . . . n and one wants to control and calculate the power to be used in a successive time step n+1 the following calculations are made:

$$p_n = \gamma_n - v \qquad \text{Eq. 4}$$

where $v = \gamma_n - p_n$.

$$p_{n+1} = \gamma_{n+1} - v \rightarrow p_{n+1} = \gamma_{n+1} - (\gamma_n - p_n) \qquad \text{Eq. 5}$$

In Eq. 5 the term $\gamma_{n+1}$ is a general power constant α in the stationary state of the system and the term $\gamma_n - p_n$ is the power setting that should be controlled for a connection. This term may be varied in accordance with β. Inserting α in Eq. 5 and varying $\gamma_n - p_n$ in accordance with β gives $$p_{n+1} = \alpha + \beta(\gamma_n - p_n) \qquad \text{Eq. 6}$$

This applies for all connections of the system in a stationary state. A stationary state means that the measurements are iterated until $p_n$ and $p_{n+1}$ both have the same value. During iteration the channel gain should remain generally constant. Moving $\beta p_n$ to the left side of Eq-1 and division of both sides by 1+β gives $$p_\infty = \frac{\alpha}{1+\beta} + \frac{\beta}{1+\beta}\gamma_\infty \qquad \text{Eq. 7}$$

Eq. 7 gives a relation between quality and power of a connection in the stationary state of the system. If the quality suddenly decreases, this will be compensated by an increased power and the compensation factor is less than one provided α and β fulfil certain restrictions to be discussed further below. From Eq. 7 it is apparent that $P_\infty$ increases beyond all limits if β=−1 and system power is out of control, which is not desired. If, however, β>−1 power will be under control and a stable stationary state of the system is attained.

Instead of using γ as a value of the channel quality the bit rate r (data rate) obtained on a channel may be used using Shannon's relation:

r≈ log (1+γ) which may be approximated with:

$$r \approx \gamma \qquad \text{Eq. 8}$$

Any other more realistic function or functions may be used by studying the relation between channel quality γ versus obtained bit rate r in a log-log diagram. A realistic function is found by examining the communication system's combinations of coding- and modulation schemes. There is no need to describe this here. It is sufficient to know that the bit rate will not increase beyond all limits as the channel quality increases, but will attain a constant state. A simple approximation is $$0 < \frac{\delta r}{\delta \gamma} < 1$$

Eq. 6 above can also be derived according to the following:

A transmission scheme with N channels is assumed. In the time-step n, the power assigned to the $i^{th}$ channel of connection k is denoted $p_{n,k,i}$. Note that index i is not to be interchanged with the symbol i used for interference above. In the same way, the data rate on the $i^{th}$ channel of connection k is denoted $r_{n,k,i}$. The average channel power (power used for transmission on the channel) and the average channel data rate of connection k in time-step n is further denoted $\bar{p}_{n,k}$ and $\bar{r}_{n,k}$, respectively, and are defined as:

$$\bar{p}_{n,k} = \frac{1}{N}\sum_{i=0}^{N-1} p_{n,k,i}, \bar{r}_{n,k} = \frac{1}{N}\sum_{i=0}^{N-1} r_{n,k,i} \qquad \text{Eq. 10 and 11}$$

In a similar way, the variation of assigned power and obtained data rate in relation to the average figures are denoted $\tilde{p}_{n,k,i}$ and $\tilde{r}_{n,k,i}$, respectively, and are defined as:

$$\tilde{p}_{n,k,i} = p_{n,k,i} - \bar{p}_{n,k}, \tilde{r}_{n,k,i} = r_{n,k,i} - \bar{r}_{n,k} \qquad \text{Eq. 12 and 13}$$

Figure 4:
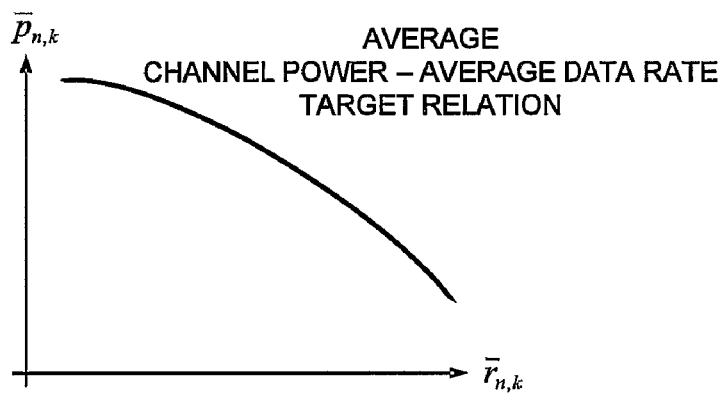
FIG. 4 is a log-log diagram illustrating a target relation between average channel power and average data rate.

The method comprises two coupled loops, the outer fairness loop that controls the connection capacity and the inner capacity loop that controls the system capacity (partitioning of resources in the network). The outer fairness loop controls the balance between the average channel power $\bar{p}_{n,k}$ and the average data rate per channel $\bar{r}_{n,k}$. The target relation for the outer fairness loop is a curve with a negative derivative and non-negative second derivative in the log-log diagram according to FIG. 4. When the average data rate decreases the average channel power increases, but only to a maximum value. The rationale to the negative derivative is that a connection which consumes a lot of resources (power), and hence causes a lot of interference in the system, must also confine with a low data rate. However, since the power per bit assigned to connections in poor positions generally exceeds the power per bit allocated to connections in good positions, the poor connections are, at least to some extent, compensated for their unfortunate situation.

To reach the target relation between the average channel power and the average data rate, the average channel power is, in every time-step, updated according to Eq. 14 below. Since the method promotes a high degree of fairness the constant $\bar{\beta}$ Equation 1 is negative ($-1 < \bar{\beta} < 0$).

$$\bar{p}_{n+1,k} = \bar{\alpha} + \bar{\beta} \cdot (\bar{r}_{n,k} - \bar{p}_{n,k}) [dB] \qquad \text{Eq. 14}$$

Figure 5:
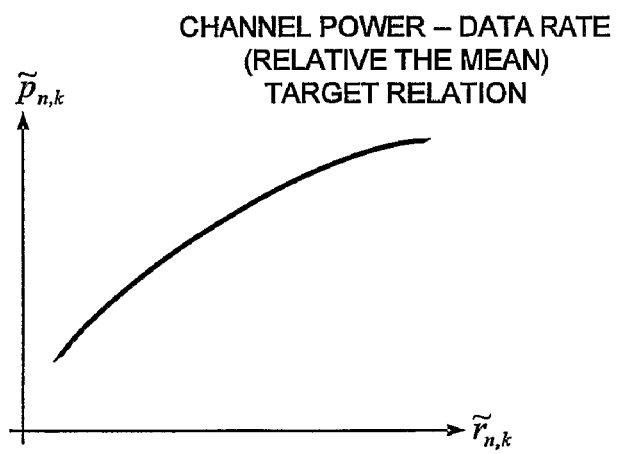
FIG. 5 is a log-log diagram illustrating a target relation between individual channel power and data rate relative the average data rate.

In the inner capacity loop the power allocation among the channels of a connection is controlled in order to achieve a reasonable balance in between channel power $\tilde{p}_{n,k,i}$ and the data rate on each channel $\tilde{r}_{n,k,i}$. In this case, the philosophy is that the power should be used where it can do the most good. That is, good carriers are assigned more power than poor carriers. The target relation between the carrier power and the data rate on each carrier is depicted in the log-log diagram of FIG. 5. In this case, the derivative of the curve is non-negative as is its second derivative. As the average data rate increases the average channel power will increase, but only to a maximum value. In each time-step, furthermore, the channel power is updated according to Equation 14 below. The value of $\tilde{\beta}$ is positive ($0 < \tilde{\beta} < 1$).

$$\tilde{p}_{n+1,k,i} = \tilde{\alpha} + \tilde{\beta} \cdot (\tilde{r}_{n,k,i} - \tilde{p}_{n,k,i}) [dB] \qquad \text{Eq. 15}$$

Note that in both loops, it is clear that once the algorithms have converged, i.e. when $\bar{p}_{n+1} = \bar{p}_n$ and $\tilde{p}_{n+1} = \tilde{p}_n$, the relation between power and rate is monotonic (in the log-log diagram). See FIGS. 4 and 5. Furthermore, the absolute value of the constants $\bar{\beta}$ and $\tilde{\beta}$ must be below 1 in order to obtain a stable system behaviour.

In the last step of the method the results of the two loops are combined in order to determine the actual transmission power to be used in the coming time-step on a connection's individual channels. This is conducted according to Eq.16 below.

$$p_{n+1,k,i} = \bar{p}_{n+1,k} + \tilde{p}_{n+1,k,i} [dB] \qquad \text{Eq. 16}$$

This relation is the same as Eq. 6 above. The terms $\bar{\alpha}$ and $\tilde{\alpha}$ have been included in $\bar{p}_{n+1,k}$ and $\tilde{p}_{n+1,k,i}$ respectively.

Figure 7:
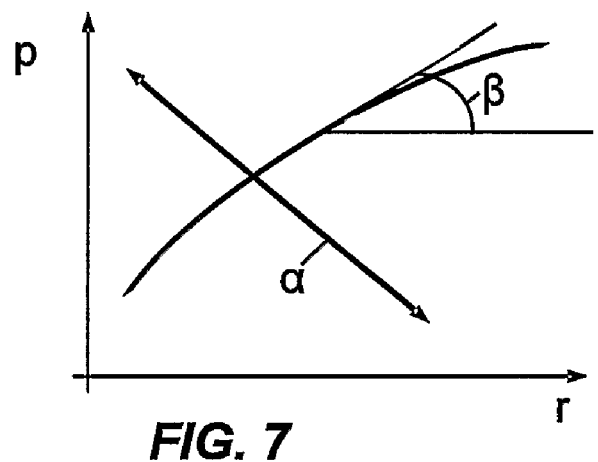
FIG. 7 is a diagram illustrating the relations between constants $\alpha$ and $\beta$.

It should be remembered that $\alpha$ and $\beta$ are system constants. In FIG. 7 the relation between $\alpha$ and $\beta$ is schematically shown. With $\alpha$ the power level and the quality level of the complete system is governed. A large $\alpha$ value will pull up the qualities.

Figure 6:
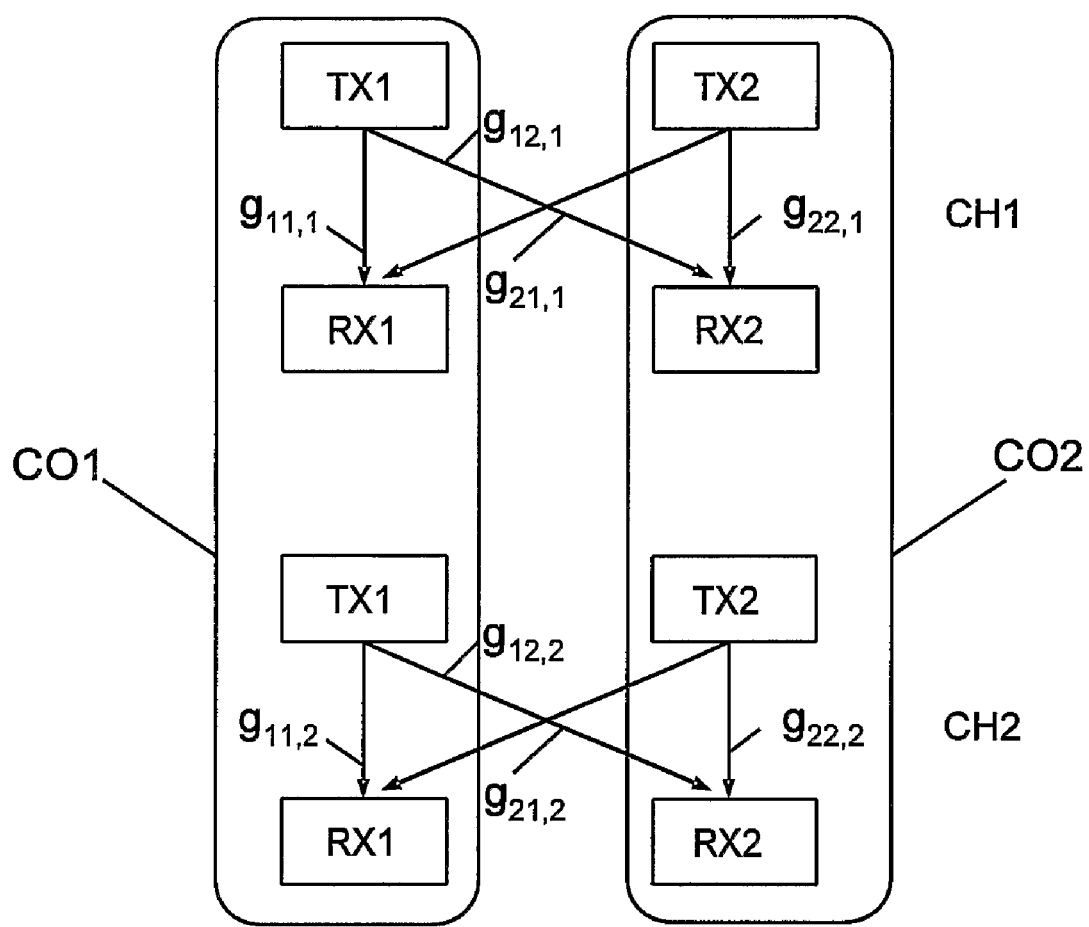
FIG. 6 is a diagram similar to FIG. 3 wherein each connection is on two channels.

FIG. 6 illustrates a multiple access radio system comprising two connections CO1 and CO2 each one on two channels CH1 and CH2. On connection CO1 there are two transmitters TX1 each one sending to a respective receiver RX1. On connection CO2 there are two transmitters TX2 each one sending to a respective receiver RX2. A gain matrix for each channel is shown by the indexed g-values. In order to obtain different bit rates and different power settings with the aid of the inner capacity loop a condition that must be fulfilled is that the matrixes:

$$\begin{pmatrix} g_{11,1} & g_{12,1} \\ g_{21,1} & g_{22,1} \end{pmatrix} \text{ for } CH1 \text{ and } \begin{pmatrix} g_{11,2} & g_{12,2} \\ g_{21,2} & g_{22,2} \end{pmatrix} \text{ for } CH2$$

are different. Because if they are equal, then the outer fairness loop will assign power to each of the connections, but the inner capacity loop will not provide any partitioning of power over a channel's individual channels. The result is then that all carriers in connection CO1 will transmit with the same power, and that all carriers in connection CO2 will also transmit with the same power, different from that in CO1. If however, the matrixes are different, then the inner capacity loop will distribute the power allocated to CO1 among the individual carriers.

If the system in FIG. 6 is a frequency divided system then it is reasonable that the gain matrixes are frequency dependent. Although only two connections are shown a real world system comprises many connections as shown in FIG. 1 and among these some are better than others due to for example multi-path fading, atmospheric conditions and other circumstances. Not all frequency bands of a connection are good, but some are better than others. Suppose that one frequency (carrier) is favourable over the other in connections CO1 and CO2. For connection CO1 we may suppose that $g_{11,1}$ is large while $g_{11,2}$ are weak. For connection CO2 we may suppose that $g_{22,2}$ is large while $g_{22,1}$ is weak. Accordingly connection CO1 will prefer to use channel CH1 while connection CO2 will prefer to use channel CH2. If the just given example is pursued one step further and one supposes, without going into details, that the connection CO1 has a quality which is better than that of the connection CO2, then the outer fairness loop would allocate proportionally more power to connection CO2 than to connection CO1. In connection CO1 the inner capacity loop would allocate more power to CH1 than to CH2 and in connection CO2 the inner capacity loop would allocate more power to CH2 than to CH1.

In a time divided system the matrixes would be time dependent and vary from time slot to time slot.

Reverting to Eq. 6 and applying the outer fairness loop on a connection whose channels whose average gain g is decreasing, for example as a result of a changed position of the connection, will result in a decreasing γ in the average. A decreasing γ in its turn will lead to an increased average power $p_{n+1}$ to be used on the connection. The inner capacity loop works on the channels of the connection in the following manner: when the channel gain g is decreasing γ will decrease and a decreasing γ will lower the power to be used in the next time step.

The method is unambiguous and distributed. Unambiguous since it always ends up in the same solution independent of the initial conditions. That is, given the radio connectivity conditions, the method always converges to the same power allocation independent of the initial power setting. The fact that the method is distributed implies that it can be implemented locally in the nodes, e.g. in terminals or in access points. There is no need for a central node coordinating the activity of all active connections, although there may be other considerations dictating that a central node should be used and therefore a central node is within the scope of the claims.

Once having access to the parameters $\overline{\alpha}$, $\alpha\overline{\beta}$, and $\tilde{\beta}$, each node must only (i) keep track of the transmit power to be used on the different channels of a connection and (ii) keep track of the resulting rate on each channel.

The method may be used in the uplink as well as the downlink of the multiple access radio system.

Figure 8:
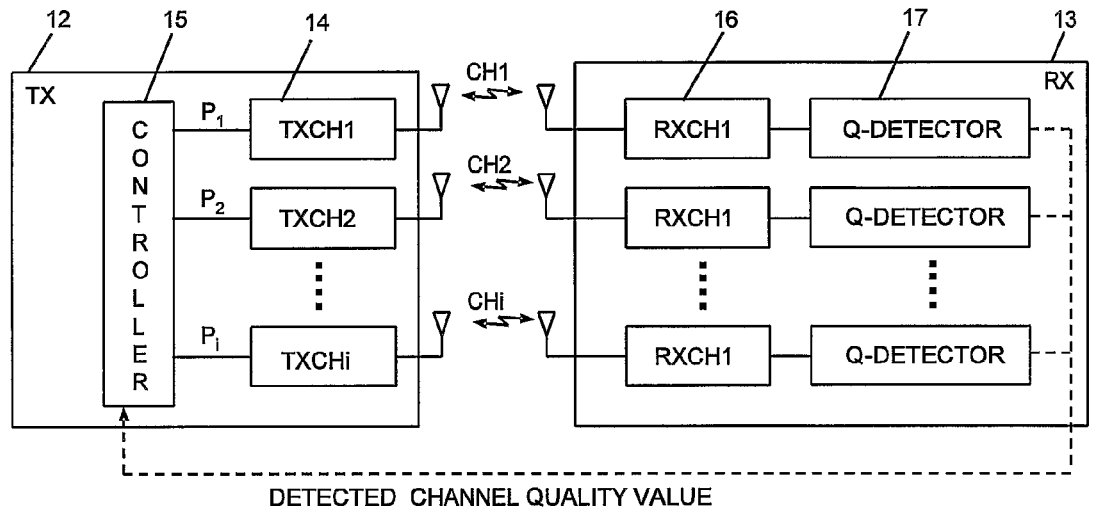
FIG. 8 is a block diagram of a transmitter.

In FIG. 8 a transmitting node 12 communicates with a receiving node 13 on a plurality of channels CH1, CH2 . . . CHn. The transmitting node is provided with a plurality of transmitters 14 and a controller 15 in which the method is embodied in the form of hardware or software or a combination thereof. The transmitters are sending on a respective channel for each connection. Although not shown the individual transmitters are provided with coders, modulators, power amplifiers and other conventional units as dictated by the individual radio access system used. At a receiving node 13 a plurality of receivers 16 are receiving the transmissions from the transmitting node 12. To each receiver a respective channel quality detector 17 is connected for measuring the quality of the respective channel, such as for example received data rate, bit error rate or other QoS measures. As indicated by the broken arrow 18 the various measured quality channel quality values $\gamma_i$ (i=1 . . . N) are reported to the transmitting node 12 so it can calculate the power to be used on the different channels in the next time step.

Figure 9:
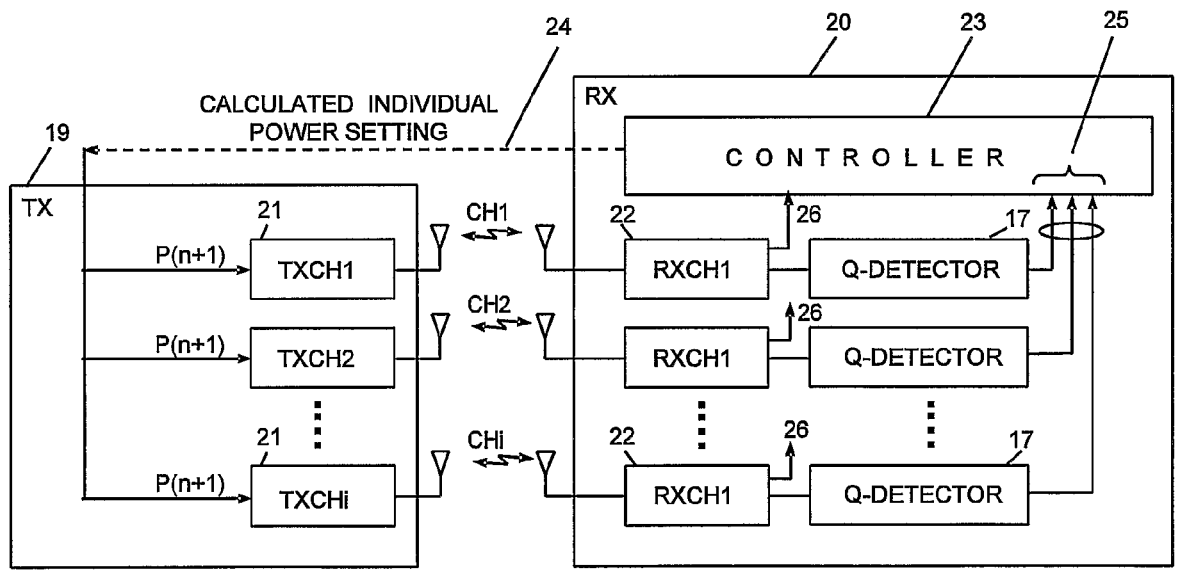
FIG. 9 is a block diagram of a receiver.
Figure 10:
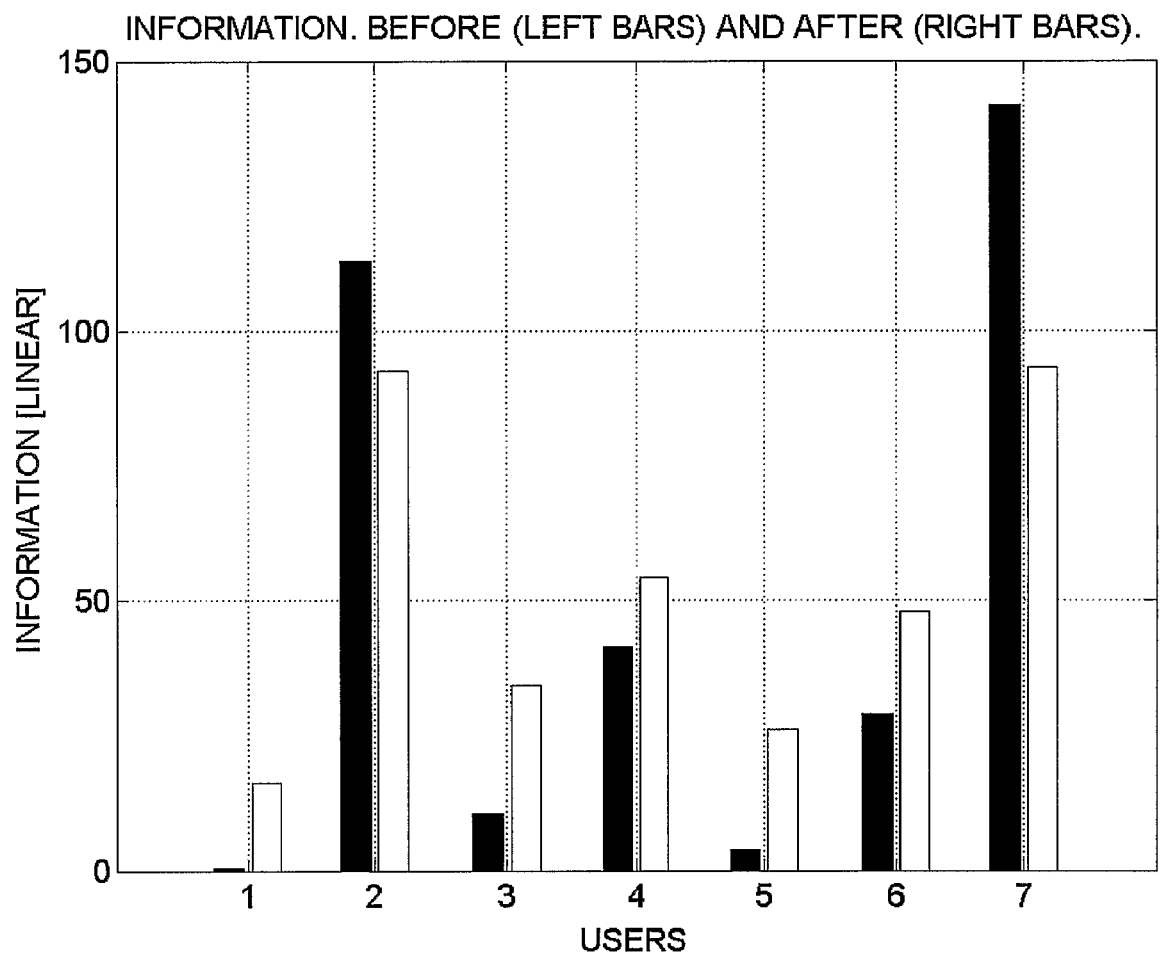
FIG. 10 is a diagram illustrating connection data rates before and after activation of the method.

In FIG. 9 a transmitting node 19 is communicating with a receiving node 20. The transmitting node is provided with a plurality of transmitters 21. The receiving node is provided with a plurality of receivers 22 and a controller 23 in which the inventive-method is embodied in the form of hardware or software or a combination thereof. The transmitters are sending on a respective channel for each connection with respective power settings calculated by the controller and signalled to the transmitter over a signalling link 24. Although not shown the individual transmitters are provided with coders, modulators, power amplifiers and other conventional units as dictated by the individual radio access system used. At a receiving node 20 each receiver is connected to a channel quality detector 17. Each detector 17 reports the quality of the respective channel to the controller 23 as is shown by arrows 25. This quality information, illustrated by arrows 26, measured in time step n−1 and stored in a non-shown memory is used by the controller 23 in order to calculate the power to be used on the individual channels in time-step n+1. During time step n the stored channel quality values from time step n−1 are fetched by the controller 23 and used for calculation of the individual power settings to be used on the different channels in time step n+1, this calculation taking place in accordance with Eq. 8.

Transmission and reception can take place on an uplink as well as a down link. This means the nodes of FIG. 8 and FIG. 9 may be used either in the uplink or in the downlink of a radio access system.

If the nodes of FIG. 8 are used in a down link the transmitting node 12 would be a central node (for example a base station) communicating with a plurality of receiving nodes 13 (for example a plurality of mobiles). The central node would have a plurality of connections with said plurality of receiving nodes and would compute individual power values to be used on the various channels in each communication.

If the nodes of FIG. 8 are used in an up-link the receiving node 13 would be a central node (a base station) communicating with a plurality of transmitting nodes (mobiles) and all calculations of the power settings individual channels of a connection would be distributed among the transmitting nodes (mobiles).

Similar considerations apply to the nodes of FIG. 9. If the nodes of FIG. 9 are used in an up link the receiving node 20 would be a central node (for example a base station) communicating with a plurality of transmitting nodes 19 (for example a plurality of mobiles). The central node would have a plurality of connections with said plurality of receiving nodes and would compute individual power values to be used on the various channels in each communication.

If the nodes of FIG. 9 are used in an down link the transmitting node 19 would be a central node (a base station) communicating with a plurality of receiving nodes (mobiles) and all calculations of the power settings individual channels of a connection would be distributed among the receiving nodes (mobiles).

In FIG. 11 connection data rates before (left bars) and after (right bars) activation of the channel and power allocation method. The connection information (data rate) is depicted for one realization in which the gain matrixes, the $\alpha$ and $\beta$ values are given, and the two loops have been iterated until a stationary state is achieved. Above the $\alpha$ and $\beta$ values are parameters in the algorithm. The data rate of the seven connections, all in different cells of a cellular system, is shown before and after the activation of the method. The method is parameterized such that both the average power and the power allocation in between channels are adapted to the conditions in the system. That is, in this example, ($\overline{\beta},\tilde{\beta}$)=(−0.7,0.7).

As seen from FIG. 11 the scheme improves the performance of connections in poor condition but lowers the performance of connections in favourable positions. The overall throughput in the system is similar in both cases. That is, one may say that in this particular case, it was possible to improve the fairness of the system without affecting the overall efficiency.

Table 1 below presents the numerical outcome of the unfairness and throughput in a system having seven cells and one user in each cell. All values shown in Table 1 are mean values resulting from many different realisations. The upper row (U=32, R=20) in Table 1 represents the communication system at an initial state, before the method is applied. The lower row (U=17(+15), R=18(−2)) in Table 1 represents the communication system after the method has been applied. FIG. 11 illustrates the results achieved when the method is applied. The respective bit rates allocated to the respective users in the initial state are illustrated by the black left bars in FIG. 11. The bit rates allocated to the users after application of the method are illustrated by the white left bars. System capacity would be the sum of the black bars. Likewise system capacity would be represented by the sum of the white bars.

In Table 1 letter R is the system capacity expressed as a mean value of the number of bits per second and per cell as transported by the communication system. Letter U is a measure of what in the Example is called "unfairness" and is the quotient between the 95-percentil and the 5-percentil of the user bit rates.

Expressed in a very broad and incomplete manner we mean with fairness that the users should be allocated roughly the same bit rates. If the variation of the user data rates is small between the users we say the system treats the users fair. As a measure for fairness we use the "unfairness" relation above.

If the unfairness measure U is close to 1 the system is fair. If U is large, the system is unfair. From the beginning and before the method is applied, the system allocates bit rates to the users unfair.

The results indicate that the variation of the data bit rates between the users has been reduced. For example, user 2, which has a bad channel, has been allocated a higher data rate while user 3, which has a good channel, has been allocated a reduced data rate. The results also indicate that by applying the method, it is possible to improve the fairness of the system (=lower the unfairness) and keep the overall system capacity unchanged.

TABLE 1

| | $\tilde{\beta} = 0$ | $\tilde{\beta} = 0.7$ |
|---|---|---|
| $\bar{\beta} = 0$ | U = 32 | |
| | R = 20 | |
| $\bar{\beta} = -0.7$ | | U = 17 (+15) |
| | | R = 18 (−2) |

The technology described above may be varied and modified within the limits set by the appending claims.

The method may be denoted as a combined scheme for channel selection and power allocation. However, it can also be referred to as a soft channel allocation scheme since more or less weight is placed on the different channels. This is so because channel selection takes place when applying the connection capacity loop (fairness loop) while power allocation takes place when applying the system capacity loop.

The invention claimed is:

1. A method of power allocation and channel allocation to connections in a multi-channel access based wireless communications system in which each connection is acting independently of the other connections, and a connection is using a plurality of communication channels simultaneously, the communication channels on which transmissions take place in the system being generally orthogonal, the method comprising the steps of:
   measuring the quality of each channel for each connection, and expressing the quality in terms of obtained data bit rate,
   repeating the measurements at successive time steps, wherein the steps comprise:
   (a) using the measurement results, pertaining to an individual connection, from one or more previous time steps in order to allocate, in the following time step, to the same connection an average power of all channels the same connection uses, said allocation being controlled by an outer fairness loop balancing said average power against an average data rate in the connection, the outer fairness loop having a target relation such that when said average data rate decreases said average power increases up to a maximum value,
   (b) allocating, in said same following time step, to the same connection power among individual ones of said all channels, said latter allocation in step (b) being controlled by an inner capacity loop balancing the power in between said all channels against the corresponding bitrates obtained on said all channels, the inner capacity loop having a target relation such that channels on which the obtained data rate is high are allocated more power than channels on which the obtained data rate is low, and
   (c) combining the results from said two allocation steps (a) and (b) in order to determine the actual transmission power to be used on the individual ones of said all channels of said individual connection at said same following time step.

2. A method in accordance with claim 1, further comprising:
   taking the measurements for each connection in the system, and
   repeating the steps (a), (b) and (c) for each active connection in the system, thereby providing distributed power allocation and channel allocation.

3. A method in accordance with claim 1, further comprising using as a target relation for the system capacity loop:

$$\bar{p}_{n+1,k} = \eta(\bar{r}_{n,k}, \bar{p}_{n,k}),$$

where $\eta(\bar{r}_{n,k}, \bar{p}_{n,k})$ is a function the derivatives of which has the following properties:

$$0 < \frac{df}{dr} < 1,$$

r being data rate in the outer fairness loop, and $$-1 < \frac{df}{dr} < 0,$$

r being the data rate in the inner capacity loop,
   $r_{n,k,i}$=data rate on connection k:s carrier i at time step n
   $p_{n,k,i}$=power assigned to carrier i of connection k at time step n $$\bar{r}_{n,k} = \frac{1}{N}\sum_{i=0}^{N-1} r_{n,k,i}$$

$$\bar{p}_{n,k} = \frac{1}{N}\sum_{i=0}^{N-1} p_{n,k,i}.$$

4. A method in accordance with claim 1, further comprising using the as target relation for the connection capacity loop (expressed in log values):

$$\bar{p}_{n+1,k} = \bar{\alpha} + \bar{\beta}(\bar{r}_{n,k} - \bar{p}_{n,k}) \text{ [dB]}, \qquad \text{Eq. 1}$$

where $-1 < \bar{\beta} < 0$
and $r_{n,k,i}$=data rate on connection k:s carrier i at time step n
   $p_{n,k,i}$=power assigned to carrier i of connection k at time step n $$\bar{r}_{n,k} = \frac{1}{N}\sum_{i=0}^{N-1} r_{n,k,i}$$

$$\bar{p}_{n,k} = \frac{1}{N}\sum_{i=0}^{N-1} p_{n,k,i}$$

where $\bar{\alpha}$ is a positive quantity.

5. A method in accordance with claim 4, further comprising using as target relation for the inner capacity loop (expressed in log values):

$$\tilde{p}_{n,k,i} = \tilde{\alpha} + \tilde{\beta}(\tilde{r}_{n,k,i} - \tilde{p}_{n,k,i}) \text{ [dB]} \qquad \text{Eq. 2}$$

where
$\tilde{\alpha}$ is a positive quantity
$0<\tilde{\beta}<1$
and $\tilde{p}_{n,k,i} p_{n,k,i} - \bar{p}_{n,k}$
$\tilde{r}_{n,k,i} = r_{n,k,i} - \bar{r}_{n,k}$.

6. A method in accordance with claim 5, wherein the following relation is used for combining the results of the outer fairness and inner capacity loops (expressed in log values):

$$p_{n+1,k,i} = \bar{p}_{n+1,k} + \tilde{p}_{n+1,k,i} \text{ [dB]}.$$

7. A method in accordance with claim 6, wherein
$\bar{\beta} = -0.7$
$\tilde{\beta} = 0.7$
$\bar{\alpha} = 15$
$\tilde{\alpha} = 15$.

8. A method in accordance with claim 1, wherein the method is applied in the downlink, in which case each active connection equipment performs the method steps and sets its own power levels.

9. A method in accordance with claim 1, wherein the method is applied in the uplink, in which case a central node performs the method steps and signals the resulting power settings to the active connection equipments.

10. A transmitting node with a plurality of transmitters transmitting simultaneously on different channels, said transmitting node comprising a controller with an input for receiving channel quality values associated with respective ones of the channels at a previous time step, a quality value for a channel being a mean value or a weighted mean value of measurements taken at several previous time steps, and for computing, from the received channel quality values of the channels of a connection, an individual power setting to be used in a following time step in each of the channels and with an output for said individual power settings, said output being connected to the respective transmitters, wherein said controller is configured to use an input associated with an outer fairness loop which balances an average power of all said channels against an average data rate of said connection and an inner capacity loop which balances the power in between said all channels against corresponding bit-rates obtained on all said channels, said controller being further configured to combine results of said loops in order to determine an actual transmission power to be used on individual ones of said all channels.

11. A transmitting node in accordance with claim 10 configured to be used in a downlink of mobile radio system.

12. A transmitting node in accordance with claim 10 configured to be used in an uplink of mobile radio system.

13. A receiving node with a plurality of receivers for receiving simultaneously on different channels, said receiving node comprising:
a plurality of quality detectors connected to the respective receivers for measuring the quality of the individual channels of a connection, and
a controller with an input for receiving channel quality values associated with respective ones of the channels at a previous time step and for computing from the received channel quality values of the channels of a connection an individual power setting to be used in a following time step in each of the channels and with an output for said individual power settings, said output being connected to the respective transmitters, wherein said controller is configured to use input from an outer fairness loop which balances an average power of all said channels against an average data rate of said connection and an inner capacity loop which balances the power in between said all channels against corresponding bit-rates obtained on all said channels, said controller being further configured to combine results of said loops in order to determine an actual transmission power to be used on individual ones of said all channels.

14. A receiving node in accordance with claim 13, configured to be used in an uplink of a mobile radio system.

15. A receiving node in accordance with claim 13, configured to be used in a downlink of a mobile radio system.

* * * * *

UNITED STATES PATENT AND TRADEMARK OFFICE
CERTIFICATE OF CORRECTION

PATENT NO. : 7,933,218 B2
APPLICATION NO. : 11/793913
DATED : April 26, 2011
INVENTOR(S) : Almgren et al.

It is certified that error appears in the above-identified patent and that said Letters Patent is hereby corrected as shown below:

In Column 6, Line 38, delete "$P_\infty$" and insert -- $p_\infty$ --, therefor.

In Column 7, Line 37, delete "Equation" and insert -- in Equation --, therefor.

In Column 9, Line 41, delete "inventive-method" and insert -- method --, therefor.

In Column 12, Line 16, in Equation, in Claim 3, delete "$\overline{p}_{n+1,k} = \eta(\overline{r}_{n,k}, \overline{p}_{n,k})$," and insert -- $$\overline{p}_{n+1,k} = f(\overline{r}_{n,k}, \overline{p}_{n,k})$$ --, therefor.

In Column 12, Line 17, in Claim 3, delete "$\eta(\overline{r}_{n,k}, \overline{p}_{n,k})$" and insert -- $$f(\overline{r}_{n,k}, \overline{p}_{n,k})$$ --, therefor.

In Column 13, Line 4, in Claim 5, delete "$\tilde{p}_{n,k,i} p_{n,k,i} - \overline{p}_{n,k}$," and insert -- $$\tilde{p}_{n,k,i} = p_{n,k,i} - \overline{p}_{n,k}$$ --, therefor.

Signed and Sealed this
Twenty-seventh Day of March, 2012

David J. Kappos
*Director of the United States Patent and Trademark Office*